(12) United States Patent
Hirosue

(10) Patent No.: US 11,267,290 B2
(45) Date of Patent: Mar. 8, 2022

(54) TIRE

(71) Applicant: SUMITOMO RUBBER INDUSTRIES, LTD., Hyogo (JP)

(72) Inventor: Eisuke Hirosue, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 421 days.

(21) Appl. No.: 16/420,448

(22) Filed: May 23, 2019

(65) Prior Publication Data
US 2019/0359002 A1 Nov. 28, 2019

(30) Foreign Application Priority Data
May 24, 2018 (JP) .............................. JP2018-099878

(51) Int. Cl.
*B60C 11/12* (2006.01)
*B60C 11/03* (2006.01)
*B60C 11/01* (2006.01)

(52) U.S. Cl.
CPC .......... *B60C 11/0302* (2013.01); *B60C 11/01* (2013.01); *B60C 11/1204* (2013.01); *B60C 11/1236* (2013.01); *B60C 11/1263* (2013.01); *B60C 2011/039* (2013.01); *B60C 2011/0369* (2013.01); *B60C 2011/0372* (2013.01); *B60C 2011/1209* (2013.01); *B60C 2011/1268* (2013.01)

(58) Field of Classification Search
CPC ..... B60C 11/01; B60C 11/12; B60C 11/1204; B60C 11/1236; B60C 11/03; B60C 11/0302; B60C 11/04; B60C 11/1263; B60C 2011/1254; B60C 2011/0341; B60C 2011/0358; B60C 2011/0369; B60C 2011/0372; B60C 2011/039; B60C 2011/1209; B60C 2011/1268
See application file for complete search history.

(56) References Cited

U.S. PATENT DOCUMENTS

| 5,974,872 | A | * | 11/1999 | Morishita | ........... G01M 17/025 |
| | | | | | 152/209.2 |
| 2016/0144664 | A1 | * | 5/2016 | Kimura | ............... B60C 11/0327 |
| | | | | | 152/209.22 |

(Continued)

FOREIGN PATENT DOCUMENTS

| JP | 2007302112 A | * | 11/2007 | ............. B60C 11/04 |
| JP | 2013-100020 A | | 5/2013 | |
| JP | 2017024657 A | * | 2/2017 | ......... B60C 11/0304 |

*Primary Examiner* — Steven D Maki
*Assistant Examiner* — Philip N Schwartz
(74) *Attorney, Agent, or Firm* — Greenblum & Bernstein, P.L.C.

(57) ABSTRACT

A tire having a tread portion. The tread portion includes a first shoulder land portion that is defined between a first shoulder main groove and a first tread end. The first shoulder land portion includes: a shoulder lateral groove that extends from the first tread end and ends in the first shoulder land portion; a first sipe that extends from an end of the shoulder lateral groove to the first shoulder main groove; and a second sipe that extends from the first tread end toward the first shoulder main groove, and ends in the first shoulder land portion. A length of the shoulder lateral groove in a tire axial direction is 0.10 to 0.30 times a width of the first shoulder land portion in the tire axial direction.

19 Claims, 8 Drawing Sheets

(56) References Cited

U.S. PATENT DOCUMENTS

2016/0185160 A1\* 6/2016 Mukai ................. B60C 11/1307
152/209.24
2018/0215203 A1\* 8/2018 Kuriyama ............... B60C 11/01

\* cited by examiner

TIRE

BACKGROUND OF THE INVENTION

Field of the Invention

The present invention relates to a tire having a shoulder lateral groove.

Description of the Background Art

In a tread portion of a tire, a shoulder lateral groove disposed in a shoulder land portion allows drainage performance of the tire to be improved. However, pitch sound, in a relatively narrow frequency band (about 400 to 500 Hz), having a high sound pressure tends to be caused by the shoulder lateral groove in running on a dry asphalt road surface. Japanese Laid-Open Patent Publication No. 2013-100020 suggests a tire which has improved structures of a shoulder lateral groove and a shoulder main groove that connects with the shoulder lateral groove, so as to improve drainage performance while maintaining noise performance.

SUMMARY OF THE INVENTION

However, even the tire disclosed in Japanese Laid-Open Patent Publication No. 2013-100020 does not have sufficiently improved noise performance, and further improvement is required.

Meanwhile, the pitch sound is caused by striking sound or pumping sound when the shoulder lateral groove contacts with the ground. Therefore, noise performance is expected to be improved by the length of the shoulder lateral groove being reduced. However, when the length of the shoulder lateral groove is reduced, stiffness of the shoulder land portion is made relatively high, and steering stability tends to be degraded.

The present invention is made in view of the aforementioned problem, and a main object of the present invention is to provide a tire that can exhibit excellent noise performance while inhibiting degradation of steering stability.

A tire according to the present invention includes a tread portion. The tread portion includes: a first shoulder main groove that extends near a first tread end continuously in a tire circumferential direction; and a first shoulder land portion that is defined between the first shoulder main groove and the first tread end. The first shoulder land portion includes: a shoulder lateral groove that extends at least from the first tread end toward the first shoulder main groove, and ends in the first shoulder land portion; a first sipe that extends, from an end of the shoulder lateral groove at which the shoulder lateral groove ends, to the first shoulder main groove; and a second sipe that extends at least from the first tread end toward the first shoulder main groove, and ends in the first shoulder land portion. A length of the shoulder lateral groove in a tire axial direction is 0.10 to 0.30 times a width of the first shoulder land portion in the tire axial direction.

In the tire of the present invention, the length of the shoulder lateral groove in the tire axial direction is preferably 0.15 to 0.25 times the width of the first shoulder land portion in the tire axial direction.

In the tire of the present invention, the second sipe preferably reaches a center position of the first shoulder land portion in the tire axial direction.

In the tire of the present invention, a maximum depth of the second sipe is preferably greater than a maximum depth of the first sipe.

In the tire of the present invention, the first shoulder land portion preferably has a longitudinal narrow groove that extends in the tire circumferential direction in a portion outward of the first tread end in the tire axial direction.

In the tire of the present invention, an outer end of the second sipe in the tire axial direction preferably connects with the longitudinal narrow groove.

In the tire of the present invention, how the tire is to be oriented when mounted to a vehicle is preferably specified, and the first tread end is preferably disposed on an inner side of the vehicle when the tire is mounted to the vehicle.

In the tire of the present invention, the tread portion preferably includes a first middle land portion that is adjacent to the first shoulder land portion through the first shoulder main groove, and the first middle land portion preferably has a plurality of middle sipes that extend in the tire axial direction.

In the tire of the present invention, a plurality of the first sipes and a plurality of the second sipes are preferably disposed in the first shoulder land portion, and the total number of the middle sipes disposed in the first middle land portion is preferably less than the total number of the first sipes and the second sipes disposed in the first shoulder land portion.

In the tire of the present invention, the first middle land portion preferably has a middle lateral groove that extends from the first shoulder main groove and ends in the first middle land portion, and the middle sipe preferably includes a first middle sipe that connects with an end of the middle lateral groove at which the middle lateral groove ends.

In the tire of the present invention, a groove, having a groove width of not less than 2 mm, other than the shoulder lateral groove is preferably not formed on a tread surface of the first shoulder land portion.

In the tire of the present invention, a maximum groove width of the shoulder lateral groove is 0.70 to 0.90 times the groove width of the first shoulder main groove.

In the tire of the present invention, an angle of the first sipe relative to the tire axial direction is 10 to 25°.

In the tire of the present invention, the first sipe has a depth that is less than the depth of the shoulder lateral groove.

The tread portion of the tire according to the present invention includes: the first shoulder main groove that extends near the first tread end continuously in the tire circumferential direction; and the first shoulder land portion that is defined between the first shoulder main groove and the first tread end. The first shoulder land portion includes: the shoulder lateral groove that extends at least from the first tread end toward the first shoulder main groove, and ends in the first shoulder land portion; the first sipe that extends from the end of the shoulder lateral groove to the first shoulder main groove; and the second sipe that extends at least from the first tread end toward the first shoulder main groove, and ends in the first shoulder land portion. The length of the shoulder lateral groove in the tire axial direction is 0.10 to 0.30 times the width of the first shoulder land portion in the tire axial direction.

The shoulder lateral groove having such a structure allows reduction of pitch sound and improvement of noise performance. Furthermore, the first sipe and the second sipe appropriately reduce stiffness of the first shoulder land portion without increasing pitch sound. Therefore, the tire of the present invention can inhibit degradation of steering stability.

DESCRIPTION OF THE PREFERRED EMBODIMENTS

An embodiment of the present invention will be described below with reference to the drawings.

Figure 1:
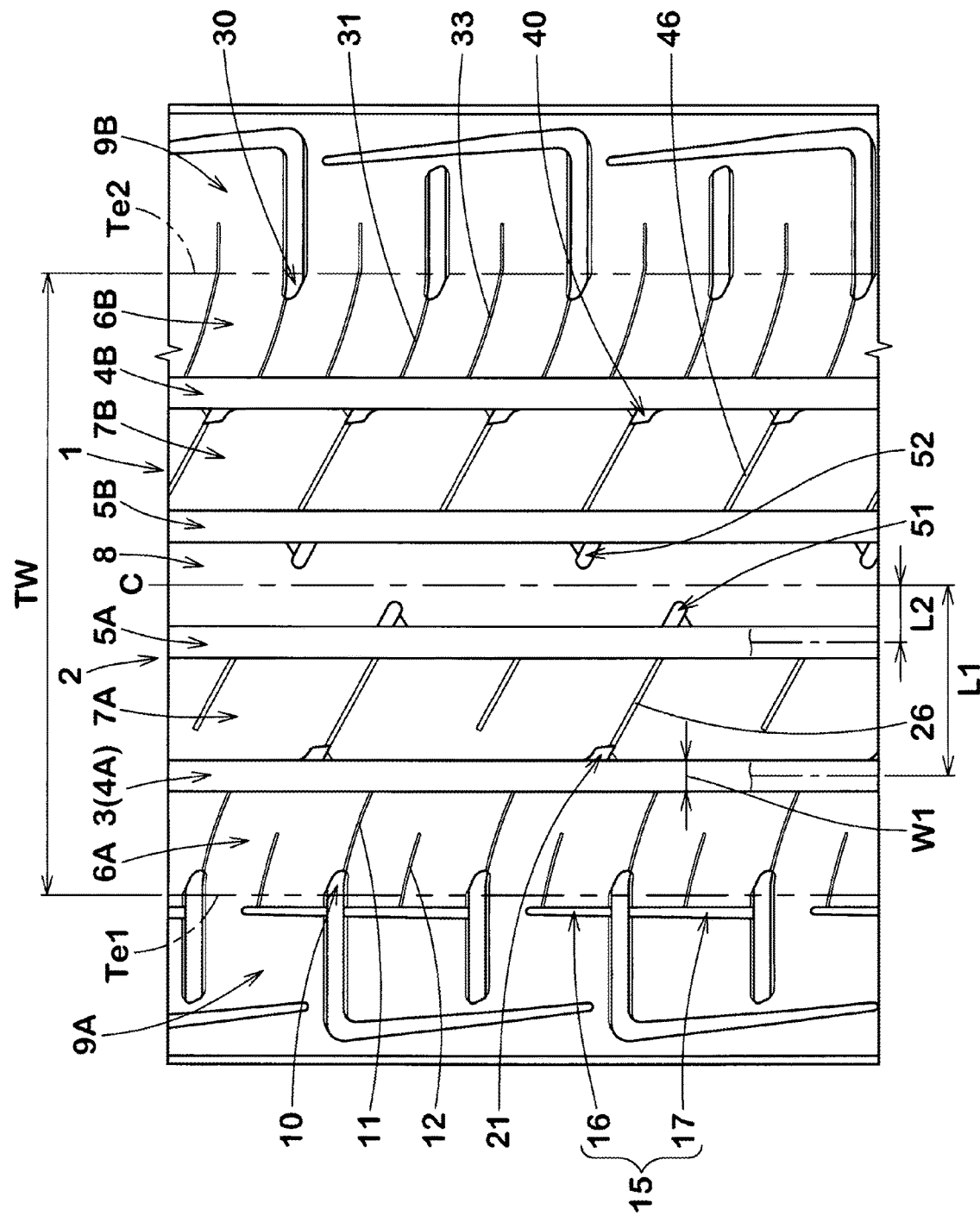
FIG. 1 is a development of a tread portion of a tire according to one embodiment of the present invention.

FIG. 1 is a development of a tread portion 2 of a tire 1 according to the present embodiment. The tire according to the present embodiment is implemented as, for example, a pneumatic tire. In the present embodiment, a summer tire which is designed to be mounted to a passenger car will be described as a preferable example.

As shown in FIG. 1, the tire has the tread portion 2. The tread portion 2 contacts with a road surface, and has various tread patterns formed therein. The tire 1 of the present embodiment has, for example, an asymmetric tread pattern. In order to maximize the properties of the tread pattern, how the tire of the present embodiment is to be oriented when mounted to a vehicle is specified. How the tire is to be oriented when mounted to a vehicle is indicated on a sidewall portion of the tire, for example, by characters or a pictogram. However, the tire of the present invention is not limited to such an example.

The tread portion 2 has a first tread end Te1 and a second tread end Te2.

The first tread end Te1 and the second tread end Te2 correspond to the ends, in the tire axial direction, of a ground contact portion of the tread portion 2 in a normal running state. In the case of the pneumatic tire, the first tread end Te1 and the second tread end Te2 are ground contact positions on the outermost sides in the tire axial direction in a state where a normal load is applied to the tire 1 in a normal state and the tire 1 is brought into contact with a plane at a camber angle of 0°. The normal state represents a state in which a tire is mounted to a normal rim and is inflated to a normal internal pressure, and no load is applied to the tire. In the description herein, unless otherwise specified, the dimensions of the components of the tire and the like are represented by values measured in the normal state.

The "normal rim" represents a rim that is defined by a standard, in a standard system including the standard with which the tire complies, for each tire, and is, for example, the "standard rim" in the JATMA standard, the "Design Rim" in the TRA standard, or the "Measuring Rim" in the ETRTO standard.

The "normal internal pressure" represents an air pressure that is defined by a standard, in a standard system including the standard with which the tire complies, for each tire, and is the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

The "normal load" represents a load that is defined by a standard, in a standard system including the standard with which the tire complies, for each tire, and is "maximum load capacity" in the JATMA standard, the maximum value recited in the table "TIRE LOAD LIMITS AT VARIOUS COLD INFLATION PRESSURES" in the TRA standard, or the "LOAD CAPACITY" in the ETRTO standard.

As in the present embodiment, in a case where how the tire 1 is to be oriented when mounted to a vehicle is specified, for example, the first tread end Te1 of the tire 1 is preferably disposed on the inner side of the vehicle when the tire 1 is mounted to the vehicle. The second tread end Te2 is preferably disposed on the outer side of the vehicle when the tire 1 is mounted to the vehicle.

In the tread portion 2, a plurality of main grooves 3 and land portions defined between the main grooves 3 are formed between the first tread end Te1 and the second tread end Te2.

Each main groove 3 extends continuously in the tire circumferential direction so as to have relatively large width and depth such that water on a road surface is drained rearward of the tire. In a preferable mode, each of the width and the depth of the main groove 3 is not less than 5 mm and more preferably not less than 6 mm. Furthermore, a width W1 of the main groove 3 is, for example, 3.5% to 5.5% of a tread width TW. The tread width TW is a distance, in the tire axial direction, from the first tread end Te1 to the second tread end Te2 in the normal state. For example, each main groove 3 extends straight along the tire circumferential direction. In another mode, the main groove 3 may non-linearly extend so as to zigzag or form a wavy shape or the like.

In the present embodiment, the tread portion 2 has, for example, four main grooves 3. The four main grooves 3 include, for example, a first shoulder main groove 4A, a second shoulder main groove 4B, a first crown main groove 5A, and a second crown main groove 5B. The first shoulder main groove 4A is, for example, formed so as to be closest to the first tread end Te1. The second shoulder main groove 4B is formed so as to be closest to the second tread end Te2. The first crown main groove 5A is, for example, formed between the first shoulder main groove 4A and a tire equator C. The second crown main groove 5B is, for example, formed between the second shoulder main groove 4B and the tire equator C. In the present embodiment, the tread portion 2 has five land portions defined by the four main grooves 3. However, the present invention is not limited to such an example. The tread portion 2 may have, for example, four land portions defined by three main grooves 3.

A distance L1, in the tire axial direction, from the tire equator C to the groove center line of the first shoulder main groove 4A or the second shoulder main groove 4B is, for example, preferably 0.25 to 0.35 times the tread width TW. A distance L2, in the tire axial direction, from the tire equator C to the groove center line of the first crown main groove 5A or the second crown main groove 5B is, for example, preferably 0.05 to 0.15 times the tread width TW.

When the main grooves 3 described above are disposed, the tread portion 2 includes a first shoulder land portion 6A, a second shoulder land portion 6B, a first middle land portion 7A, a second middle land portion 7B, and a crown land portion 8. The first shoulder land portion 6A has a tread surface defined between the first shoulder main groove 4A and the first tread end Te1. The second shoulder land portion 6B has a tread surface defined between the second shoulder main groove 4B and the second tread end Te2. The first middle land portion 7A is defined between the first shoulder main groove 4A and the first crown main groove 5A. The second middle land portion 7B is defined between the second shoulder main groove 4B and the second crown main groove 5B. The crown land portion 8 is defined between the first crown main groove 5A and the second crown main groove 5B.

Figure 2:
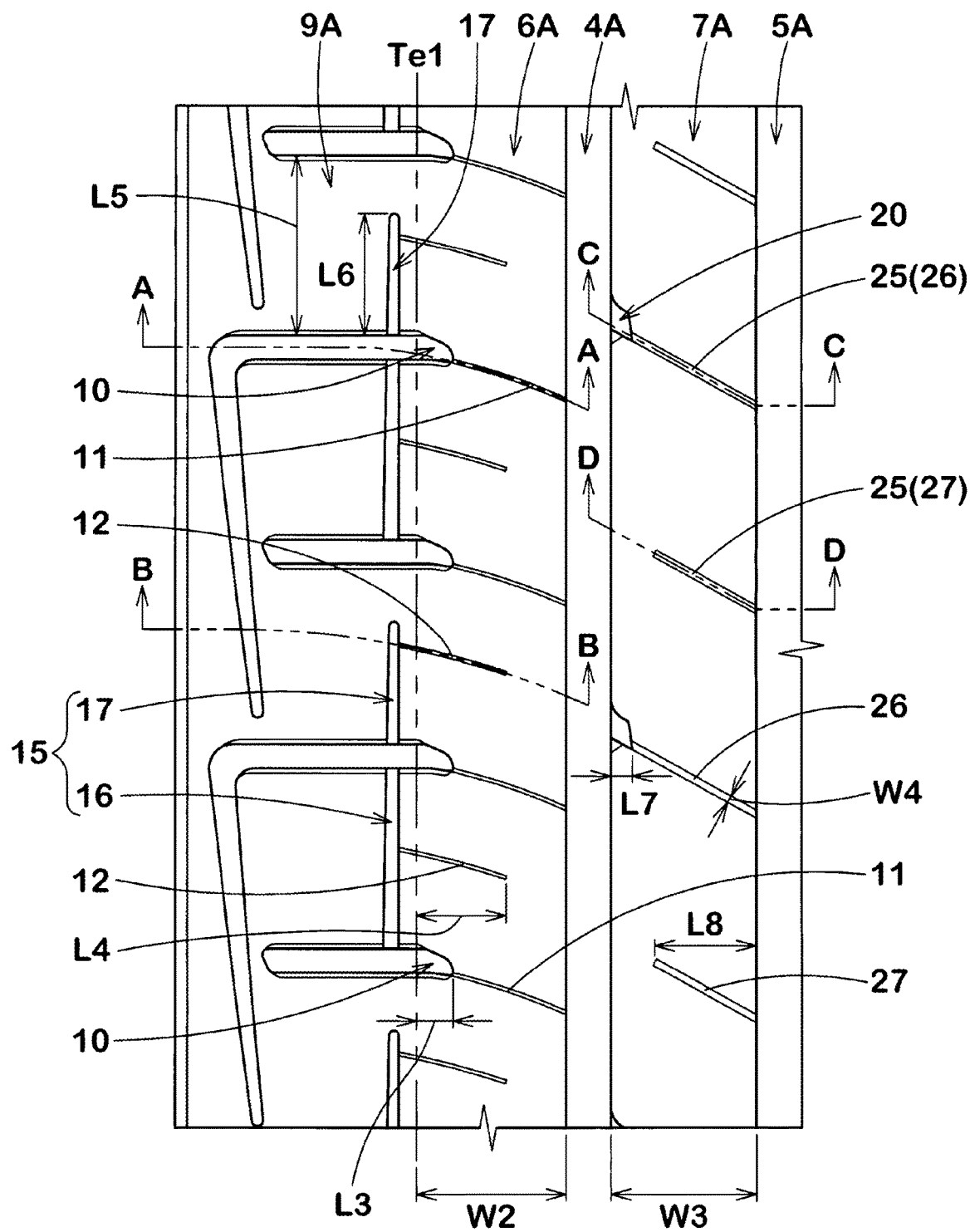
FIG. 2 is an enlarged view of a first shoulder land portion and a first middle land portion shown in FIG. 1.

FIG. 2 is an enlarged view of the first shoulder land portion 6A and the first middle land portion 7A. As shown in FIG. 2, the first shoulder land portion 6A has a buttress surface 9A that is continuous outward of the first tread end Te1 in the tire axial direction. The buttress surface 9A is tilted in the tire axially outward direction toward the tire radially inner side, and is continuous with the sidewall portion.

In the first shoulder land portion 6A, a plurality of shoulder lateral grooves 10, a plurality of first sipes 11, and a plurality of second sipes 12 are formed. Each shoulder lateral groove 10 extends at least from the first tread end Te1 toward the first shoulder main groove 4A, and ends in the first shoulder land portion 6A. A length L3 of the shoulder lateral groove 10 in the tire axial direction is 0.10 to 0.30 times a width W2 of the first shoulder land portion 6A in the tire axial direction.

The above-described relationship is satisfied on the tread surface of the tread portion 2. That is, the length L3 of the shoulder lateral groove 10 in the tire axial direction corresponds to a distance, in the tire axial direction, from the first tread end Te1 to the end of the shoulder lateral groove 10 at which the shoulder lateral groove 10 ends. Furthermore, the width of the first shoulder land portion 6A in the tire axial direction is represented as a width on the tread surface, and corresponds to a distance, in the tire axial direction, from the first tread end Te1 to the longitudinal edge of the first shoulder main groove 4A. Hereinafter, in the description herein, unless otherwise specified, the size of each of the land portions, and the grooves or sipes formed in the tread surfaces of the land portions is represented as the size on the tread surface.

The first sipe 11 extends from the end of the shoulder lateral groove 10 to the first shoulder main groove 4A. The second sipe 12 extends at least from the first tread end Te1 toward the first shoulder main groove 4A, and ends in the first shoulder land portion 6A. In the description herein, the "sipe" represents a cut portion having a width of less than 1.5 mm. The width of the sipe is, for example, preferably 0.5 to 1.0 mm. Each of the widths of the first sipe 11 and the second sipe 12 disposed in the first shoulder land portion 6A is, for example, more preferably 0.5 to 0.7 mm. For example, the depth of the sipe is, but is not particularly limited to, preferably not less than 2.0 mm and preferably less than the depth of the main groove 3.

The shoulder lateral groove 10 of the present invention has a length that is less than the length in a conventional tire, and allows pitch sound to be reduced. Therefore, excellent noise performance is exhibited. Meanwhile, when only the shoulder lateral groove 10 having such a small length is disposed in the shoulder land portion, stiffness of the shoulder land portion is enhanced, responsiveness in steering becomes excessive, and steering stability eventually tends to be degraded. In particular, when the first shoulder land portion 6A is disposed on the inner side of a vehicle when the tire is mounted to the vehicle, if stiffness of the first shoulder land portion 6A is higher than stiffness of the second shoulder land portion 6B, self-aligning torque of the tire is reduced, and steering stability eventually tends to be further degraded.

The first sipes 11 and the second sipes 12 of the present invention appropriately reduce the stiffness of the first shoulder land portion 6A without increasing pitch sound. Therefore, the tire of the present invention prevents responsiveness in steering from becoming excessive. Furthermore, the first sipes 11 and the second sipes 12 contribute to maintaining of self-aligning torque of the tire in a case where the first shoulder land portion 6A is disposed on the inner side of a vehicle when the tire is mounted to the vehicle. These effects inhibit degradation of steering stability.

In order to further enhance the above-described effects, the length L3 of the shoulder lateral groove 10 in the tire axial direction is more preferably 0.15 to 0.25 times the width W2 of the first shoulder land portion 6A in the tire axial direction. Furthermore, the length L3 of the shoulder lateral groove 10 is preferably 4 to 15 mm.

For example, the maximum groove width of the shoulder lateral groove 10 is preferably less than the groove width of the first shoulder main groove 4A, and preferably greater than 0.50 times the groove width of the first shoulder main groove 4A. More specifically, the maximum groove width of the shoulder lateral groove 10 is preferably 0.70 to 0.90 times the groove width of the first shoulder main groove 4A.

For example, the first sipe 11 is preferably tilted relative to the tire axial direction. An angle of the first sipe 11 relative to the tire axial direction is, for example, less than 45°. Specifically, the angle of the first sipe 11 relative to the tire axial direction is preferably 10 to 25°. The first sipe 11 having such a structure provides frictional force also in the tire axial direction, and allows cornering performance to be improved.

Figure 3:
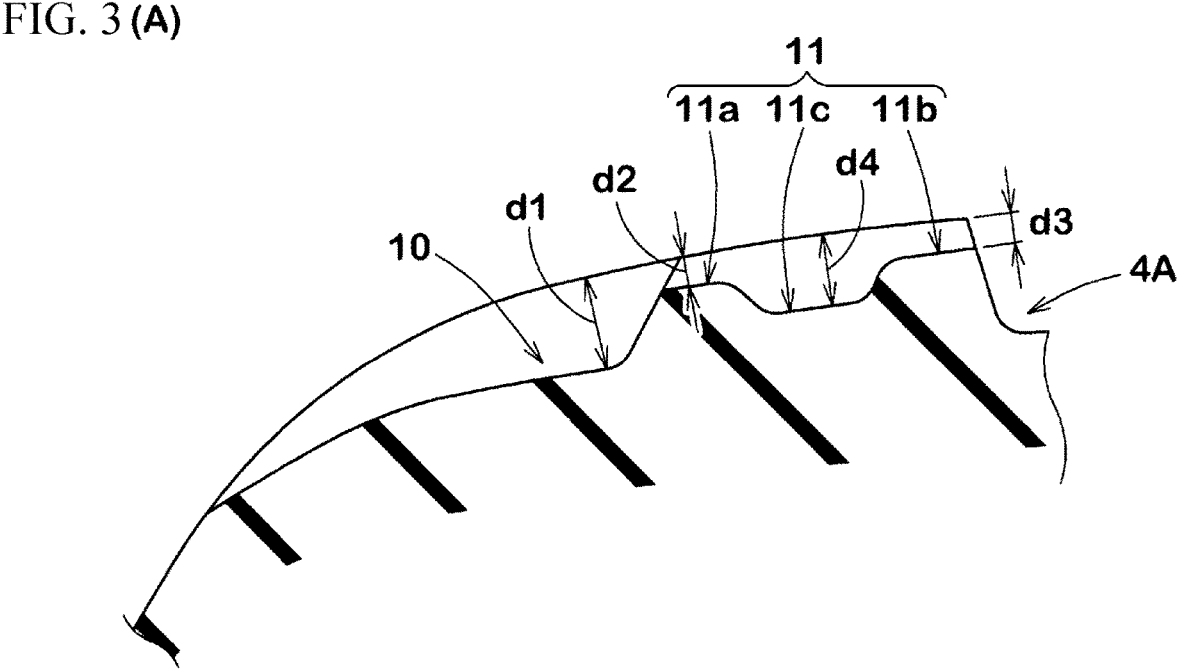
FIG. 3(A) is a cross-sectional view taken along a line A-A in FIG. 2.
FIG. 3(B) is a cross-sectional view taken along a line B-B in FIG. 2.
Figure 3:
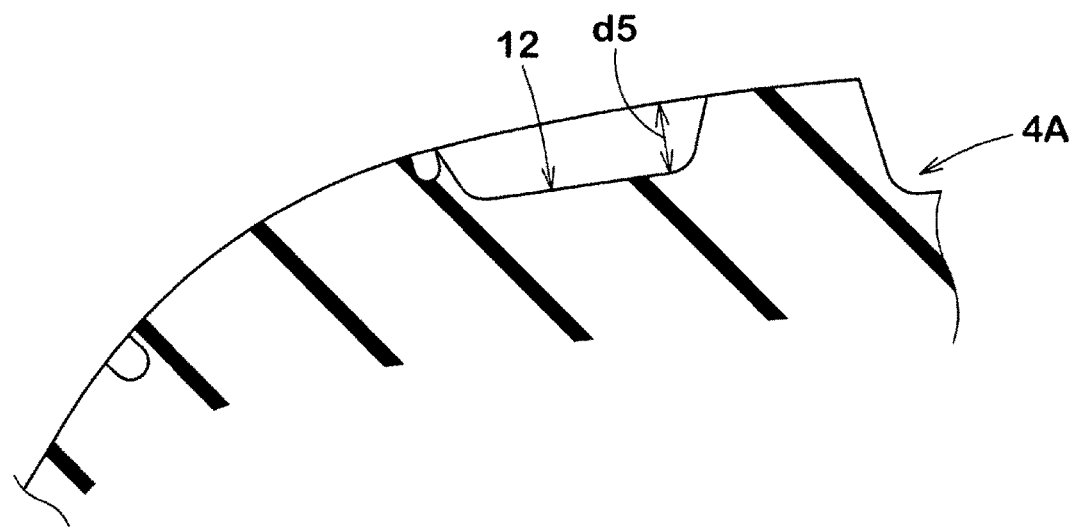

FIG. 3(A) is a cross-sectional view of the shoulder lateral groove 10 and the first sipe 11 as taken along a line A-A. As shown in FIG. 3(A), the first sipe 11 has, for example, a depth that is less than the depth of the shoulder lateral groove 10.

In the present embodiment, the first sipe 11 includes, for example, an outer side portion 11a that connects with the shoulder lateral groove 10, an inner side portion 11b that connects with the first shoulder main groove 4A, and a mid-portion 11c between the outer and the inner side portions 11a and 11b. A depth d2 of the outer side portion 11a is equal to a depth d3 of the inner side portion 11b. Each of the depth d2 of the outer side portion 11a and the depth d3 of the inner side portion 11b is, for example, 0.20 to 0.30 times a maximum depth d1 of the shoulder lateral groove 10.

A depth d4 of the mid-portion 11c is greater than the depth d2 of the outer side portion 11a or the depth d3 of the inner side portion 11b. The depth d4 of the mid-portion 11c is, for example, 0.50 to 0.70 times the maximum depth d1 of the shoulder lateral groove 10. The first sipe 11 having such a structure facilitates dispersion of frequency bands of striking sound in ground contact, and improves noise performance.

In the similar viewpoint, the length of the inner side portion 11b in the tire axial direction is preferably greater than the length of the outer side portion 11a in the tire axial direction. The length of the mid-portion 11c in the tire axial direction is preferably greater than the length of the inner side portion 11b in the tire axial direction.

As shown in FIG. 2, for example, the second sipe 12 preferably reaches the center position of the first shoulder land portion 6A in the tire axial direction. The aforementioned center position is the center position in the tire axial direction on the tread surface from the first tread end Te1 to the first shoulder main groove 4A. In a preferable mode, a length L4 of the second sipe 12 in the tire axial direction is, for example, 0.55 to 0.65 times the width W2 of the first shoulder land portion 6A in the tire axial direction. The second sipe 12 having such a structure allows steering stability to be improved while noise performance is maintained.

The second sipe 12 is, for example, tilted relative to the tire axial direction in the same direction as the direction in which the first sipe 11 is tilted. An angle of the second sipe 12 relative to the tire axial direction is, for example, less than 45°. Specifically, the angle of the second sipe 12 relative to the tire axial direction is, for example, 10 to 25°. In a preferable mode, the second sipe 12 is disposed so as to be parallel to the first sipe 11.

FIG. 3(B) is a cross-sectional view of the second sipe 12 as taken along a line B-B. As shown in FIG. 3(B), a maximum depth d5 of the second sipe 12 is, for example, 0.50 to 0.70 times the maximum depth d1 (shown in FIG. 3(A)) of the shoulder lateral groove 10. In the present embodiment, the maximum depth d5 of the second sipe 12 is preferably greater than the maximum depth of the first sipe 11. Thus, striking sound is likely to become white noise when the first sipe 11 and the second sipe 12 contact with the ground.

As shown in FIG. 2, the first shoulder land portion 6A preferably has a longitudinal narrow groove 15 that extends in the tire circumferential direction in a portion outward of the first tread end Te1 in the tire axial direction. In the present embodiment, for example, the longitudinal narrow groove 15 extends linearly so as to be parallel to the tire circumferential direction. The longitudinal narrow groove 15 having such a structure contributes to improvement of anti-wandering performance.

The maximum groove width of the longitudinal narrow groove 15 is preferably less than the maximum groove width of the first shoulder main groove 4A. Furthermore, the maximum groove width of the longitudinal narrow groove 15 is preferably less than the maximum groove width of the shoulder lateral groove 10.

In the present embodiment, the longitudinal narrow groove 15 includes, for example, a first longitudinal narrow groove 16 that connects between two shoulder lateral grooves 10 that are adjacent to each other in the tire circumferential direction, and a second longitudinal narrow groove 17 that extends from one shoulder lateral groove 10 in the tire circumferential direction and ends in the first shoulder land portion 6A. The longitudinal narrow groove 15 having such a structure allows pitch sound by the shoulder lateral groove 10 to become white noise.

In the present embodiment, a region obtained by the first longitudinal narrow groove 16 being extended so as to be parallel to the tire circumferential direction preferably overlaps the end portion of the second longitudinal narrow groove 17. When the longitudinal narrow groove 15 is thus disposed, anti-wandering performance can be further improved.

The first longitudinal narrow groove 16 preferably has a groove width that is gradually reduced from one of the end portions toward the other of the end portions. In the present embodiment, the longitudinal narrow groove 15 preferably has a groove width that is gradually reduced from the one of the end portions of the first longitudinal narrow groove 16 to the end of the second longitudinal narrow groove 17 at which the second longitudinal narrow groove 17 ends.

In order to further improve anti-wandering performance and noise performance, a length L6 of the second longitudinal narrow groove 17 in the tire circumferential direction is preferably 0.50 to 0.70 times a length L5, in the tire circumferential direction, of a land portion piece between the two shoulder lateral grooves 10.

The outer end of the second sipe 12 in the tire axial direction preferably connects with the longitudinal narrow groove 15. Thus, the second sipe 12 is likely to be appropriately opened, and striking sound can be reduced when the second sipe 12 contacts with the ground.

In order to further improve noise performance, it is preferable that a groove, having a groove width of not less than 2 mm, other than the shoulder lateral groove 10 is not formed on the tread surface of the first shoulder land portion 6A.

The first middle land portion 7A is adjacent to the first shoulder land portion 6A through the first shoulder main groove 4A. The first middle land portion 7A has a plurality of middle lateral grooves 20, and a plurality of middle sipes 25 that extend in the tire axial direction.

Each middle lateral groove 20 extends from the first shoulder main groove 4A and ends in the first middle land portion 7A. The middle lateral groove 20 ends, for example, on the first shoulder main groove 4A side rather than the tire axially center position side in the first middle land portion 7A. A length L7 of the middle lateral groove 20 in the tire axial direction is, for example, 0.10 to 0.25 times a width W3 of the first middle land portion 7A in the tire axial direction. In a more preferable mode, the length L7 of the middle lateral groove 20 in the tire axial direction is less than the length of the shoulder lateral groove 10 in the tire axial direction. The middle lateral groove 20 having such a structure allows well-balanced improvement of steering stability and noise performance.

For example, the middle sipe 25 linearly extends so as to be tilted relative to the tire axial direction. For example, the middle sipe 25 is preferably tilted in the same direction as the direction in which the first sipe 11 and the second sipe 12 disposed in the first shoulder land portion 6A are tilted. An angle of the middle sipe 25 relative to the tire axial direction is, for example, less than 45°. Furthermore, the angle of the middle sipe 25 relative to the tire axial direction is preferably greater than the angle of each of the first sipe 11 and the second sipe 12 relative to the tire axial direction. Specifically, the angle of the middle sipe 25 relative to the tire axial direction is preferably 20 to 40°.

For example, a width W4 of the middle sipe 25 is preferably greater than the width of each of the first sipe 11 and the second sipe 12. Specifically, the width W4 of the middle sipe 25 is preferably 0.7 to 0.9 mm. The middle sipe 25 having such a structure allows steering stability to be further improved.

The middle sipes 25 include, for example, a first middle sipe 26 and a second middle sipe 27. For example, the first middle sipe 26 extends from the first crown main groove 5A toward the first tread end Te1 and connects with the end of the middle lateral groove 20 at which the middle lateral groove 20 ends. The second middle sipe 27 extends from the first crown main groove 5A toward the first tread end Te1 and ends in the first middle land portion 7A. The first middle sipe 26 and the second middle sipe 27 having such structures allow noise performance to be further improved.

The total number Nm of the middle sipes 25 disposed in the first middle land portion 7A is preferably less than the total number Ns of the first sipes 11 and the second sipes 12 disposed in the first shoulder land portion 6A. The total number Nm is, for example, 0.4 to 0.6 times the total number Ns. When the sipes are thus disposed, pitch sound by the sipes disposed in the first shoulder land portion 6A and pitch sound by the sipes disposed in the first middle land portion 7A are allowed to become white noise, and noise performance can be improved.

Figure 4:
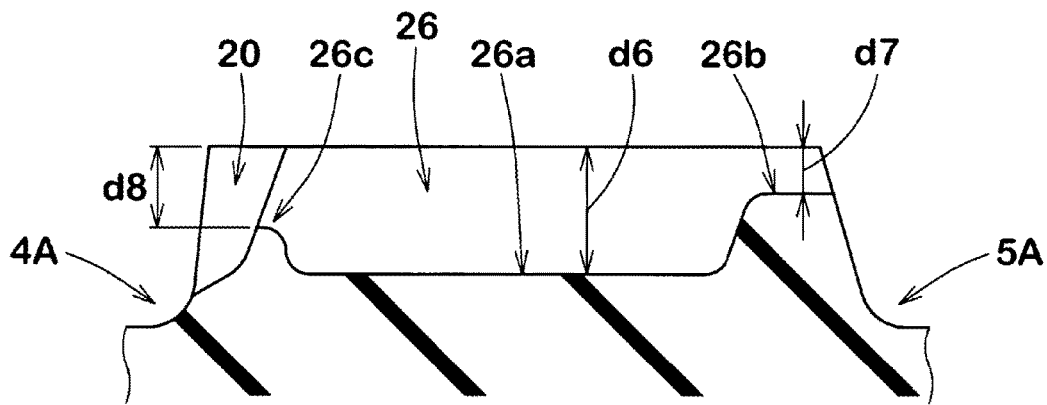
FIG. 4(A) is a cross-sectional view taken along a line C-C in FIG. 2.
FIG. 4(B) is a cross-sectional view taken along a line D-D in FIG. 2.
Figure 4:
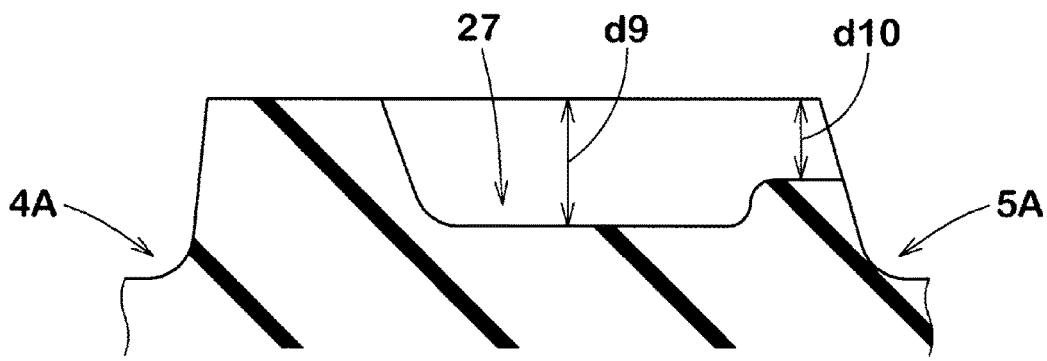

FIG. 4(A) is a cross-sectional view of the middle lateral groove 20 and the first middle sipe 26 as taken along a line C-C. As shown in FIG. 4(A), each first middle sipe 26 has a body portion 26a including the maximum depth portion, a first end portion 26b that connects with the first crown main groove 5A, and a second end portion 26c that connects with the middle lateral groove 20.

The first end portion 26b of the first middle sipe 26 has, for example, a depth d7 that is less than the depth of the body portion 26a. The depth d7 of the first end portion 26b is, for example, 0.30 to 0.45 times a maximum depth d6 of the body portion 26a.

For example, a depth d8 of the second end portion 26c is preferably greater than the depth d7 of the first end portion 26b. Furthermore, the depth d8 of the second end portion 26c is, for example, less than the maximum depth d6 of the body portion 26a. The depth d8 of the second end portion 26c is, for example, 0.55 to 0.70 times the maximum depth d6 of the body portion 26a. Thus, dispersion of frequency bands of striking sound is caused when the first middle sipe 26 contacts with the ground, and noise performance is improved.

In the similar viewpoint, the length of the second end portion 26c in the tire axial direction is preferably less than the length of the first end portion 26b in the tire axial direction.

As shown in FIG. 2, for example, the second middle sipe 27 reaches the center position of the first middle land portion 7A in the tire axial direction, and ends in a portion that is closer to the first tread end Te1 than the center position is. The second middle sipe 27 ends, for example, in a portion that is closer to the tire equator C than the end of the middle lateral groove 20 is. Specifically, for example, a length L8 of the second middle sipe 27 in the tire axial direction is preferably 0.60 to 0.80 times the width W3 of the first middle land portion 7A in the tire axial direction.

FIG. 4(B) is a cross-sectional view of the second middle sipe 27 as taken along a line D-D. As shown in FIG. 4(B), for example, the bottom surface of the end portion of the second middle sipe 27 on the first crown main groove 5A side is raised. A depth d10 of the end portion of the second middle sipe 27 is, for example, 0.55 to 0.70 times a maximum depth d9 of the second middle sipe 27. In a more preferable mode, the depth d10 of the end portion of the second middle sipe 27 is equal to the depth of the second end portion 26c of the first middle sipe 26. The second middle sipe 27 having such a structure allows noise performance and steering stability to be improved, and can also inhibit uneven wear in the first middle land portion 7A.

Figure 5:
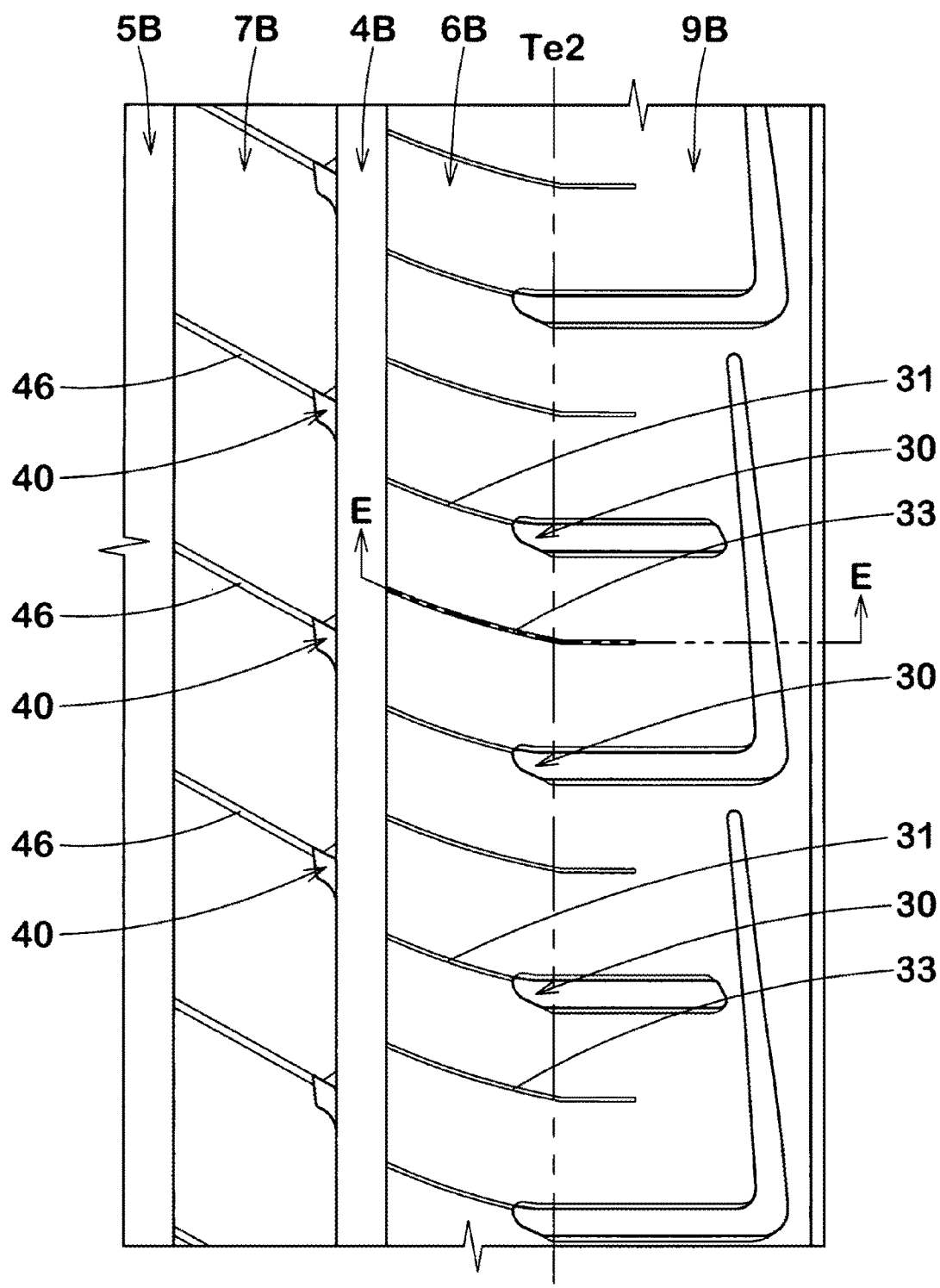
FIG. 5 is an enlarged view of a second shoulder land portion and a second middle land portion shown in FIG. 1.

FIG. 5 is an enlarged view of the second shoulder land portion 6B and the second middle land portion 7B. As shown in FIG. 5, the second shoulder land portion 6B has a buttress surface 9B that is continuous outward of the second tread end Te2 in the tire axial direction. The buttress surface 9B is tilted in the tire axially outward direction toward the tire radially inner side, and is continuous with the sidewall portion.

The second shoulder land portion 6B includes shoulder lateral grooves 30 and first sipes 31. To the shoulder lateral grooves 30 and the first sipes 31 disposed in the second shoulder land portion 6B, the structures of the shoulder lateral grooves 10 and the first sipes 11 disposed in the first shoulder land portion 6A can be applied.

Third sipes 33 are disposed in the second shoulder land portion 6B. For example, each third sipe 33 extends outward from the second shoulder main groove 4B in the tire axial direction, and extends at least to the second tread end Te2. In the present embodiment, the third sipe 33 ends in a portion outward of the second tread end Te2 in the tire axial direction. The third sipes 33 having such structures can effectively reduce stiffness of the second shoulder land portion 6B, and allows excellent steering stability to be exhibited.

Figure 6:
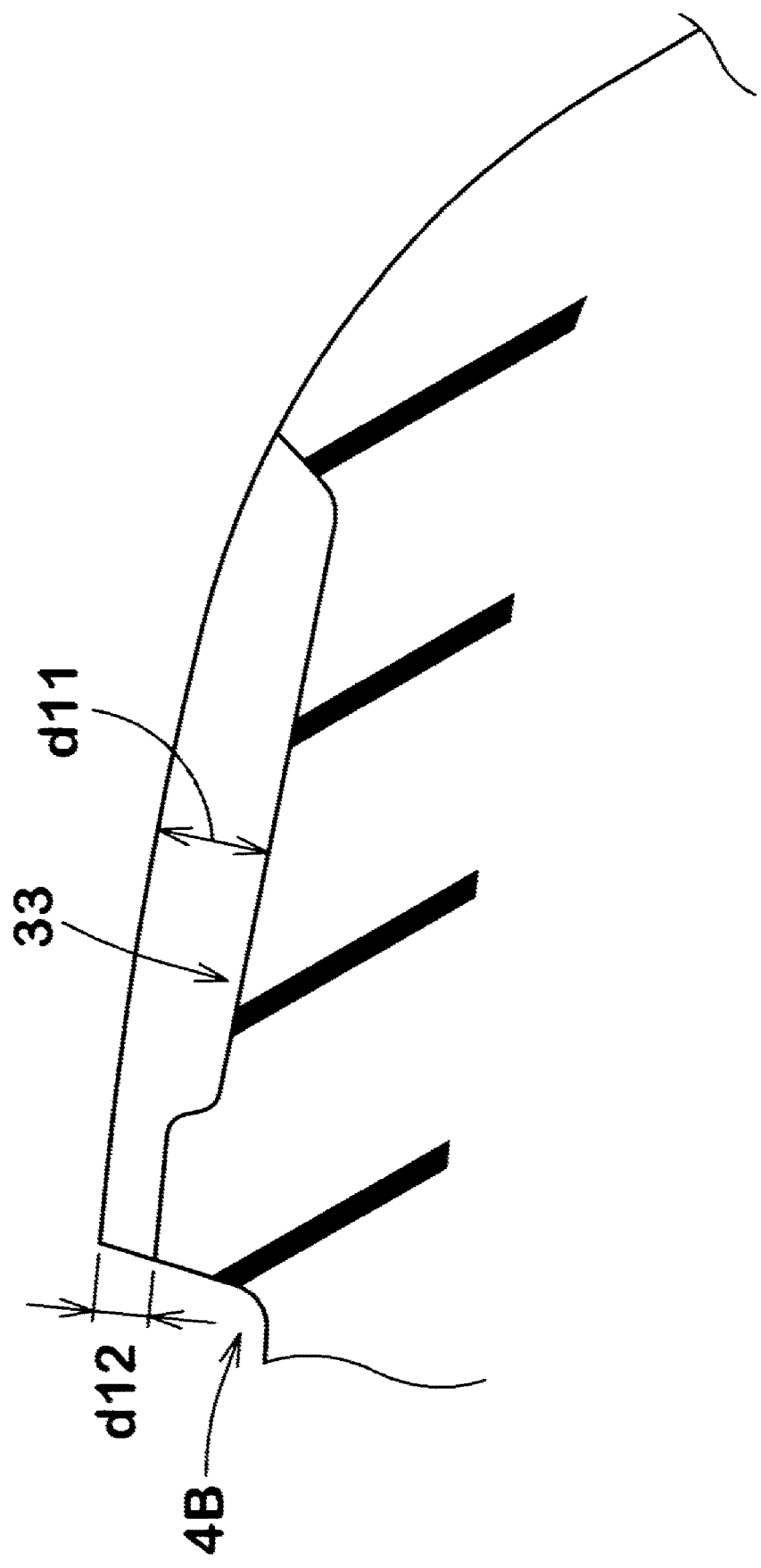
FIG. 6 is a cross-sectional view taken along a line E-E in FIG. 5.

FIG. 6 is a cross-sectional view of the third sipe 33 as taken along a line E-E. As shown in FIG. 6, the bottom surface of the end portion of the third sipe 33 on the second shoulder main groove 4B side is raised. A depth d12 of the end portion of the third sipe 33 is, for example, 0.45 to 0.65 times a maximum depth d11 of the third sipe 33.

As shown in FIG. 5, the second shoulder land portion 6B does not have the longitudinal narrow grooves, which are disposed in the first shoulder land portion 6A. Thus, pitch sound generated by the shoulder lateral grooves 30 disposed in the second shoulder land portion 6B and pitch sound generated by the shoulder lateral groove 10 disposed in the first shoulder land portion 6A are allowed to become white noise, and noise performance is improved. Furthermore, in the present embodiment, when the tire 1 is mounted to a vehicle, since the second shoulder land portion 6B is disposed on the outer side of the vehicle, even if the longitudinal narrow grooves are not disposed in this land portion, anti-wandering performance is maintained.

The second middle land portion 7B has middle lateral grooves 40 and first middle sipes 46. To the middle lateral grooves 40 and the first middle sipes 46 disposed in the second middle land portion 7B, the structures of the middle lateral grooves 20 and the first middle sipes 26 disposed in the first middle land portion 7A can be applied.

Figure 7:
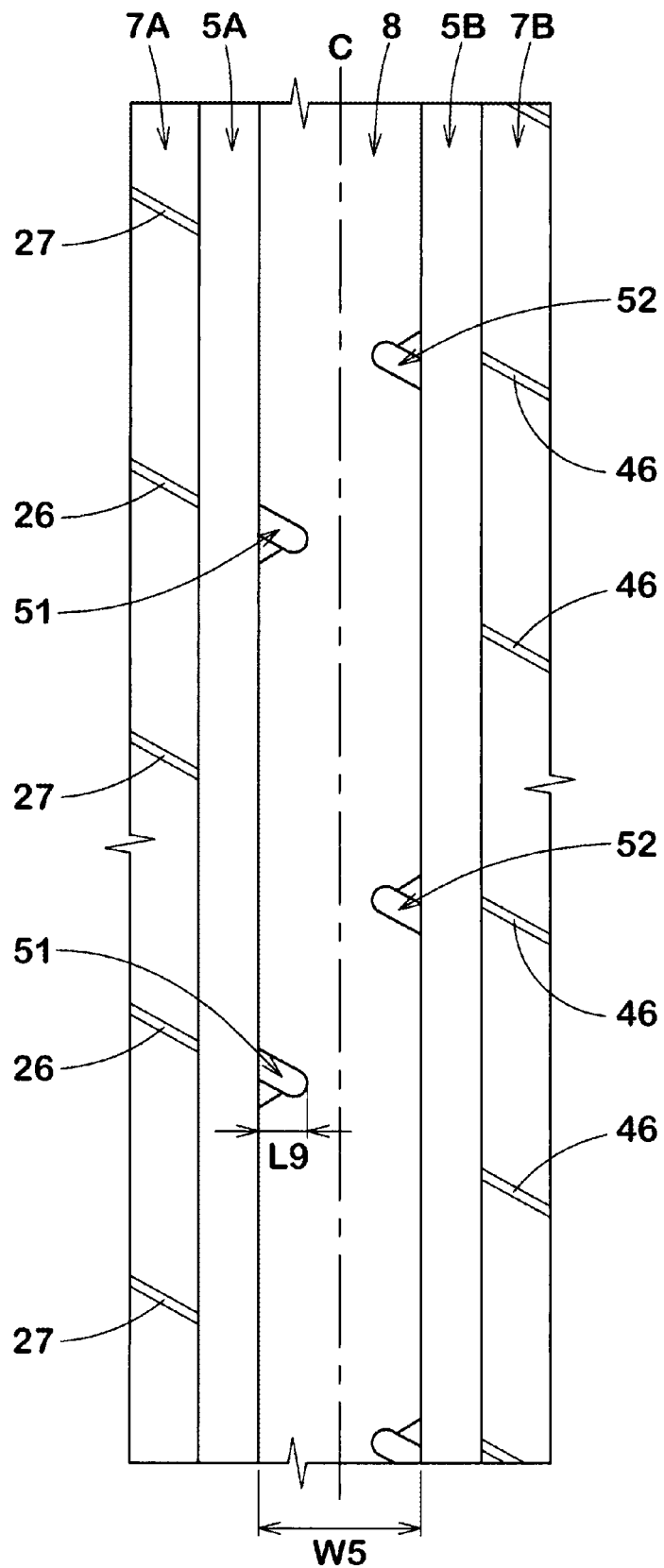
FIG. 7 is an enlarged view of a crown land portion in FIG. 1.

FIG. 7 is an enlarged view of the crown land portion 8. As shown in FIG. 7, the crown land portion 8 has, for example, a plurality of first crown lateral grooves 51 and a plurality of second crown lateral grooves 52. Each first crown lateral groove 51 extends from the first crown main groove 5A and ends in the crown land portion 8. Each second crown lateral groove 52 extends from the second crown main groove 5B and ends in the crown land portion 8.

Each first crown lateral groove 51 and each second crown lateral groove 52 preferably end so as not to reach the center position of the crown land portion 8 in the tire axial direction. Furthermore, for example, a length L9, in the tire axial direction, of the first crown lateral groove 51 or the second crown lateral groove 52 is preferably 0.20 to 0.40 times a width W5 of the crown land portion 8 in the tire axial direction. The first crown lateral grooves 51 and the second crown lateral grooves 52 having such structures can allow well-balanced improvement of noise performance and steering stability.

The first crown lateral groove 51 and the second crown lateral groove 52 are preferably displaced from each other in the tire circumferential direction. Specifically, a region obtained by the first crown lateral groove 51 being extended in the length direction thereof does not preferably overlap the second crown lateral groove 52. Similarly, a region obtained by the second crown lateral groove 52 being extended in the length direction thereof does not preferably overlap the first crown lateral groove 51. When the first crown lateral grooves 51 and the second crown lateral grooves 52 are thus disposed, pitch sounds by the first crown lateral grooves 51 and the second crown lateral grooves 52 are allowed to become white noise.

In the present embodiment, regions obtained by extending each first crown lateral groove 51 on both ends in the length direction thereof overlap the first middle sipe 26 disposed in the first middle land portion 7A and the first middle sipe 46 disposed in the second middle land portion 7B, respectively. Meanwhile, regions obtained by extending each second crown lateral groove 52 on both ends in the length direction Test vehicle: engine displacement of 2500 cc, front wheel drive vehicle
Position at which tire was mounted: all wheels
<Steering Stability>
Sensory evaluation was made by a driver for steering stability when the test vehicle ran on a paved road in a dry state. The result is indicated as scores with the score of comparative example being 100. The greater the value of the score is, the more excellent steering stability is.
<Noise Performance>
The test vehicle ran on a dry road surface at 40 to 100 km/h. The highest sound pressure of noise caused by pitch sound at this time was measured. The result is indicated as indexes with the sound pressure of comparative example being 100. The less the value of the index is, the lower the noise is and the more excellent noise performance is.

The test result is indicated in Table 1.

TABLE 1

|  | Comp. Ex. | Example 1 | Example 2 | Example 3 | Example 4 | Example 5 | Example 6 |
|---|---|---|---|---|---|---|---|
| Figure showing tread pattern | FIG. 8 | FIG. 1 | FIG. 1 | FIG. 1 | FIG. 1 | FIG. 1 | FIG. 1 |
| Length L3 of shoulder lateral groove/width W2 of first shoulder land portion | 0.50 | 0.23 | 0.10 | 0.15 | 0.20 | 0.25 | 0.30 |
| Steering stability (score) | 100 | 104 | 100 | 102 | 103 | 104 | 104 |
| Noise performance (index) | 100 | 95 | 93 | 94 | 95 | 95 | 97 | thereof do not overlap the second middle sipe 27 disposed in the first middle land portion 7A and the first middle sipe 46 disposed in the second middle land portion 7B, and are displaced from the second middle sipe 27 and the first middle sipe 46 in the tire circumferential direction. When the first crown lateral grooves 51 and the second crown lateral grooves 52 are thus disposed, dispersion of frequency bands of pitch sounds generated in the crown land portion 8, the first middle land portion 7A, and the second middle land portion 7B is allowed.

Although the tire according to the preferable embodiment of the present invention has been described above in detail, the present invention is not limited to the above-described specific embodiment, and various modifications can be made to implement the present invention.

Examples

Figure 8:
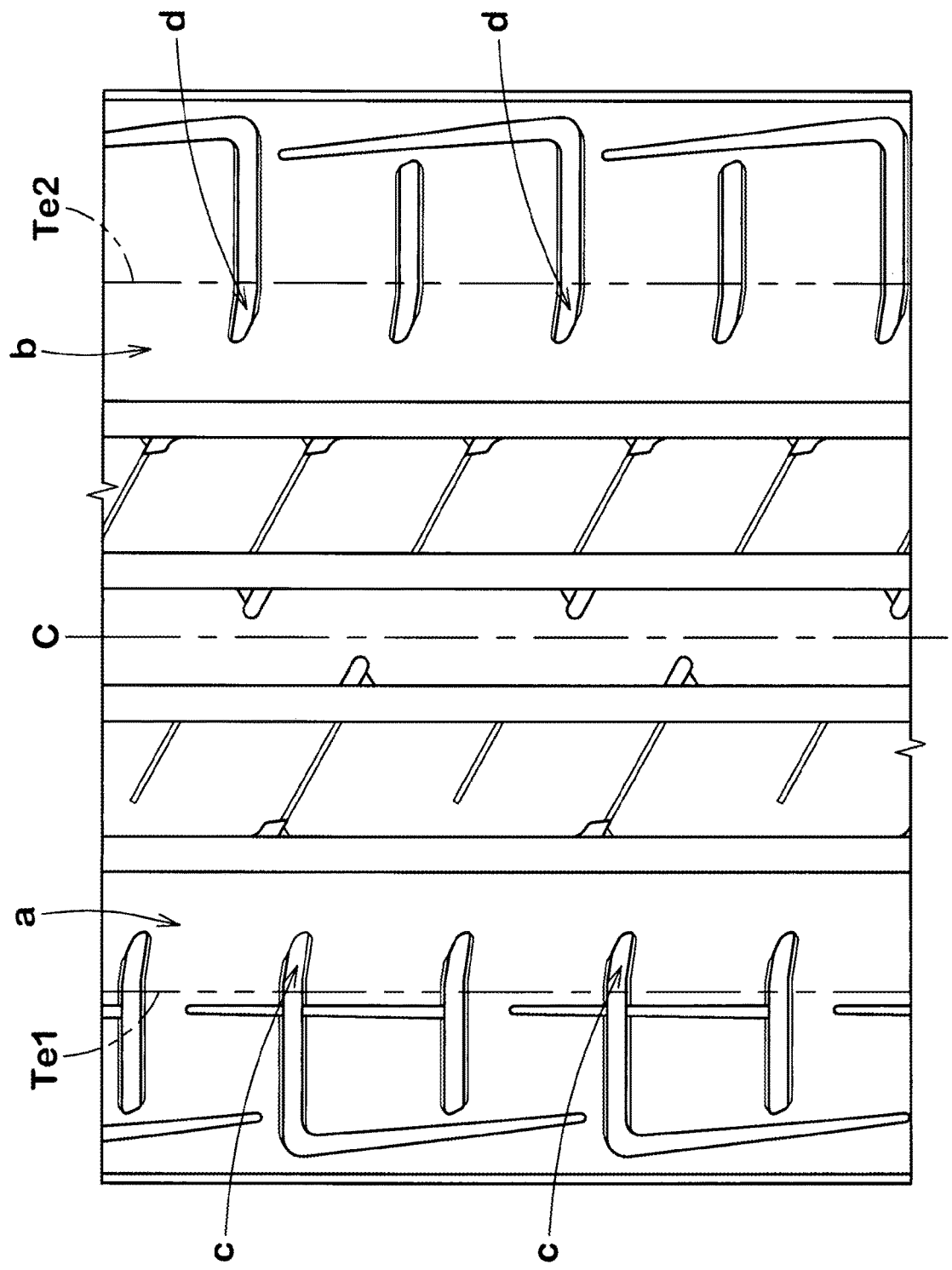
FIG. 8 is a development of a tread portion of a tire according to comparative example.

Pneumatic tires each having a fundamental tread pattern shown in FIG. 1 and the size of 215/60R16 were produced as test tires according to specifications indicated in Table 1. For a comparative example, a tire having a tread pattern shown in FIG. 8 was produced as a test tire. In the tread pattern shown in FIG. 8, the length, in the tire axial direction, of a shoulder lateral groove c disposed in a first shoulder land portion a is 0.50 times the width of the first shoulder land portion a in the tire axial direction. Furthermore, the length, in the tire axial direction, of a shoulder lateral groove d disposed in a second shoulder land portion b is 0.50 times the width of the second shoulder land portion b in the tire axial direction. Each of the shoulder land portions a and b has no sipes. The tread pattern shown in FIG. 8 is substantially the same as the tread pattern shown in FIG. 1 except for the above-described structures. Each test tire was tested for steering stability and noise performance. Specifications common to all the test tires and the test method are as follows.

Rim on which tire was mounted: 16×7.0 J
Tire internal pressure: 250 KPa

According to the test result, it can be confirmed that the tires of examples exhibit excellent noise performance. Furthermore, it can be confirmed that the tires of examples also exhibit excellent steering stability due to the first sipes and the second sipes.

What is claimed is:

1. A tire comprising
a tread portion, wherein
the tread portion includes a first shoulder main groove that extends near a first tread end continuously in a tire circumferential direction, and a first shoulder land portion that is defined between the first shoulder main groove and the first tread end,
the first shoulder land portion includes
a shoulder lateral groove that extends at least from the first tread end toward the first shoulder main groove, and ends in the first shoulder land portion,
a first sipe that extends, from an end of the shoulder lateral groove at which the shoulder lateral groove ends, to the first shoulder main groove, and
a second sipe that extends at least from the first tread end toward the first shoulder main groove, and ends in the first shoulder land portion,
a length of the shoulder lateral groove in a tire axial direction is 0.10 to 0.30 times a width of the first shoulder land portion in the tire axial direction, and
the first sipe has a depth that is less than the depth of the shoulder lateral groove.

2. The tire according to claim 1, wherein the length of the shoulder lateral groove in the tire axial direction is 0.15 to 0.25 times the width of the first shoulder land portion in the tire axial direction.

3. The tire according to claim 1, wherein the second sipe reaches a center position of the first shoulder land portion in the tire axial direction.

4. The tire according to claim 1, wherein a maximum depth of the second sipe is greater than a maximum depth of the first sipe.

5. The tire according to claim 1, wherein the first shoulder land portion has a longitudinal narrow groove that extends in the tire circumferential direction in a portion outward of the first tread end in the tire axial direction.

6. The tire according to claim 5, wherein an outer end of the second sipe in the tire axial direction connects with the longitudinal narrow groove.

7. The tire according to claim 1, wherein how the tire is to be oriented when mounted to a vehicle is specified, and the first tread end is disposed on an inner side of the vehicle when the tire is mounted to the vehicle.

8. The tire according to claim 1, wherein
the tread portion includes a first middle land portion that is adjacent to the first shoulder land portion through the first shoulder main groove, and
the first middle land portion has a plurality of middle sipes that extend in the tire axial direction.

9. The tire according to claim 8, wherein
a plurality of the first sipes and a plurality of the second sipes are disposed in the first shoulder land portion, and
the total number of the middle sipes disposed in the first middle land portion is less than the total number of the first sipes and the second sipes disposed in the first shoulder land portion.

10. The tire according to claim 8, wherein
the first middle land portion has a middle lateral groove that extends from the first shoulder main groove and ends in the first middle land portion, and
the middle sipe includes a first middle sipe that connects with an end of the middle lateral groove at which the middle lateral groove ends.

11. The tire according to claim 1, wherein a groove, having a groove width of not less than 2 mm, other than the shoulder lateral groove is not formed on a tread surface of the first shoulder land portion.

12. The tire according to claim 1, wherein a maximum groove width of the shoulder lateral groove is 0.70 to 0.90 times the groove width of the first shoulder main groove.

13. The tire according to claim 1, wherein an angle of the first sipe relative to the tire axial direction is 10 to 25°.

14. The tire according to claim 3, wherein the maximum depth of the second sipe is greater than a maximum depth of the first sipe.

15. The tire according to claim 3, wherein the first shoulder land portion has a longitudinal narrow groove that extends in the tire circumferential direction in a portion outward of the first tread end in the tire axial direction.

16. The tire according to claim 15, wherein an outer end of the second sipe in the tire axial direction connects with the longitudinal narrow groove.

17. The tire according to claim 3, wherein how the tire is to be oriented when mounted to a vehicle is specified, and the first tread end is disposed on an inner side of the vehicle when the tire is mounted to the vehicle.

18. The tire according to claim 14, wherein the first shoulder land portion has a longitudinal narrow groove that extends in the tire circumferential direction in a portion outward of the first tread end in the tire axial direction.

19. The tire according to claim 18, wherein an outer end of the second sipe in the tire axial direction connects with the longitudinal narrow groove.

* * * * *